(12) United States Patent
Nagashima et al.

(10) Patent No.: US 6,964,450 B2
(45) Date of Patent: Nov. 15, 2005

(54) SLIDING ROOF DEVICE FOR VEHICLES

(75) Inventors: Youji Nagashima, Kariya (JP); Katsutoshi Kato, Aichi-ken (JP); Kenji Maeta, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 26 days.

(21) Appl. No.: 10/809,410

(22) Filed: Mar. 25, 2004

(65) Prior Publication Data

US 2005/0127720 A1  Jun. 16, 2005

(30) Foreign Application Priority Data

Mar. 28, 2003 (JP) .............................. 2003-092886

(51) Int. Cl.[7] .............................................. B60J 7/057
(52) U.S. Cl. ................................................... 296/223
(58) Field of Search ....................................... 296/223

(56) References Cited

U.S. PATENT DOCUMENTS 4,940,450 A * 7/1990 Miyamura et al. .......... 474/152
5,026,113 A * 6/1991 DiCarlo et al. ............. 296/221
6,431,644 B1   8/2002 Nagashima
2002/0060478 A1 * 5/2002 Maeta et al. ........... 296/216.04

FOREIGN PATENT DOCUMENTS

JP     2001-280428      10/2001
JP     2002-154328      5/2002

OTHER PUBLICATIONS

European Search Report dated Jul. 29, 2004.

* cited by examiner

*Primary Examiner*—Dennis H. Pedder
(74) *Attorney, Agent, or Firm*—Finnegan, Henderson, Farabow, Garrett & Dunner, LLP

(57) ABSTRACT

A sliding roof device for vehicles includes a movable panel to open or close an opening portion provided at a vehicle roof, a pair of guide rails provided at both sides in width direction of the opening portion and extending in longitudinal direction of the vehicle, an operation mechanism guided by the guide rail and supporting the movable panel, a drive device driving the operation mechanism, and a spur tooth rack belt connecting the operation mechanism with the drive device wherein the drive device includes a drive gearwheel engaging with the spur gear rack belt, and the drive gearwheel is formed with variable tooth thickness along the gear width.

2 Claims, 4 Drawing Sheets

US 6,964,450 B2

SLIDING ROOF DEVICE FOR VEHICLES

CROSS REFERENCE TO RELATED APPLICATIONS

This application is based on and claims priority under 35 U.S.C. §119 with respect to a Japanese Patent Application 2003-092886, filed on Mar. 28, 2003, the entire content of which is incorporated herein by reference.

FIELD OF THE INVENTION

The present invention generally relates to a sliding roof device or a sunroof device for vehicle.

BACKGROUND OF THE INVENTION

For a vehicular sliding roof device, a Japanese Patent Laid-Open Publication published as No. 2002-154328 has been disclosed. This sliding roof device includes a gear system as a driving device to transmit actuation to a sliding mechanism, which opens and closes a slide panel. A spur tooth rack belt and a spur wheel are used as a gear system. The spur tooth rack belt is connected to the sliding mechanism and the spur wheel.

However, if the dimensional accuracy of the spur tooth rack belt and the spur wheel is insufficient, such a sliding roof device tends to make a noise at an engaging region between the spur tooth rack belt and the spur wheel when the slide panel is operated to open and close. Especially, the spur tooth rack belt is made of a resin to be provided in the roof device with bending condition. Deformation of the spur tooth rack belt caused by loading aggravates the engagement accuracy, since the resin belt is resilient. It makes the operational noise louder.

A need thus exists for a sliding rood device that is able to effectively reduce a noise made at engaging operation.

SUMMARY OF THE INVENTION

In light of foregoing, according to an aspect of the present invention, a sliding roof device for vehicles includes a movable panel to open or close an opening portion provided at a vehicle roof, a pair of guide rails provided at both sides in width direction of the opening portion and extending in longitudinal direction of the vehicle, an operation mechanism guided by the guide rail and supporting the movable panel, a drive device driving the operation mechanism, and a spur tooth rack belt connecting the operation mechanism with the drive device wherein the drive device includes a drive gearwheel engaging with the spur gear rack belt, and the drive gearwheel is formed with variable tooth thickness along the gear width (in the gear rotation axis direction).

It is preferable that the drive device is formed as trapezoidal cone.

BRIEF DESCRIPTION OF THE DRAWING FIGURES

The foregoing and additional features and property of the present invention will become more apparent from the following detailed description considered with reference to the accompanying drawing figures wherein.

DETAILED DESCRIPTION OF THE INVENTION

A preferred embodiment of the present invention will be described hereinbelow in detail with reference to the accompanying drawings.

Figure 1:
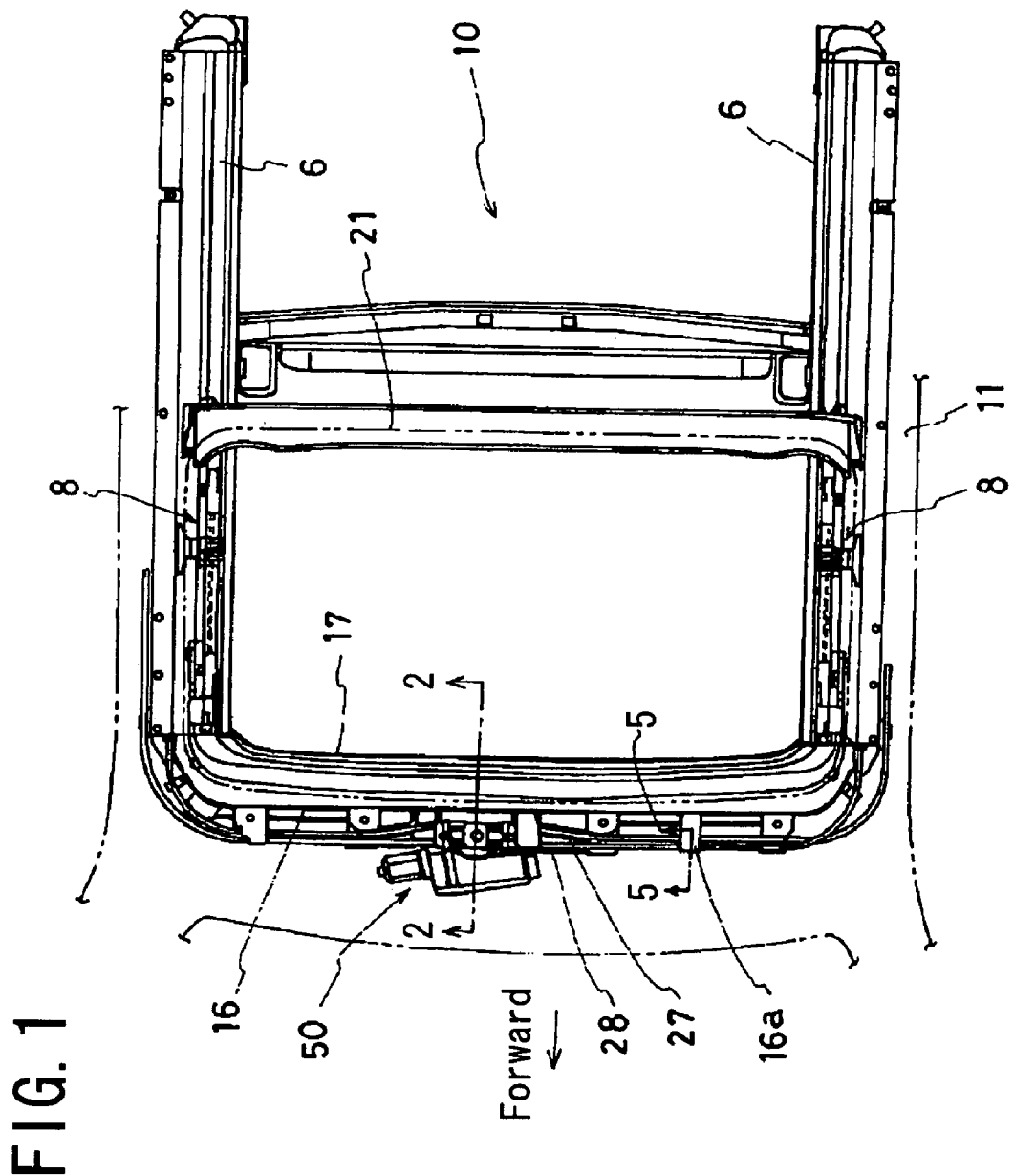
FIG. 1 is a plane view schematically illustrating a sliding roof device according to an embodiment of the present invention.
Figure 2:
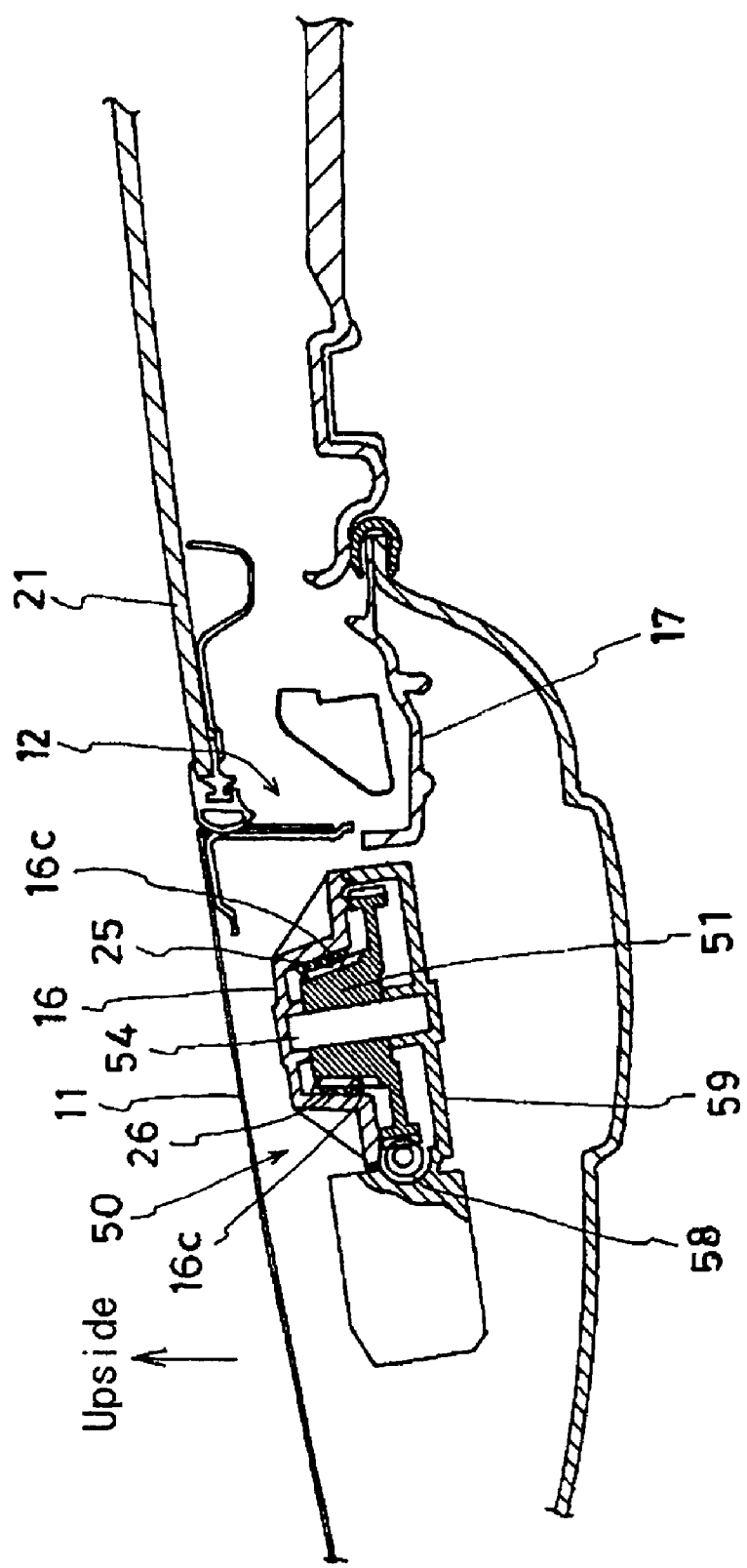
FIG. 2 is a cross sectional view taken along line 2—2 in FIG. 1.

An embodiment of the present invention is explained referring to FIGS. 1 to 5. As shown in FIG. 1 and FIG. 2, a function of a sliding roof device (sun roof device) 10 according to the present invention is same as known sliding roof devices. Namely, an opening portion 12 provided at a roof 11 of a vehicle is opened and closed using a movable panel 21.

A pair of guide rails 6 is provided at both sides of vehicle width direction of the opening portion 12 with extending in longitudinal direction of the vehicle. A pair of operation mechanism 8 is movably supported and guided on each guide rail. A slide panel 21 is formed to cover the opening portion 12, and is supported by each operation mechanism 8 at both left-right end to forward of the vehicle. The operation mechanism 8 enable the movable panel 21 to move, tilt up and tilt down with coordinating to the guide rail 6 as well as known sliding roof device s.

A front housing 16 is attached to front side of the opening portion 12 with connecting each front end of the guide rail 6. A front gutter portion 17 is provided in a direction parallel to the front housing 16 and is supported at both ends of the front housing 16.

Figure 3:
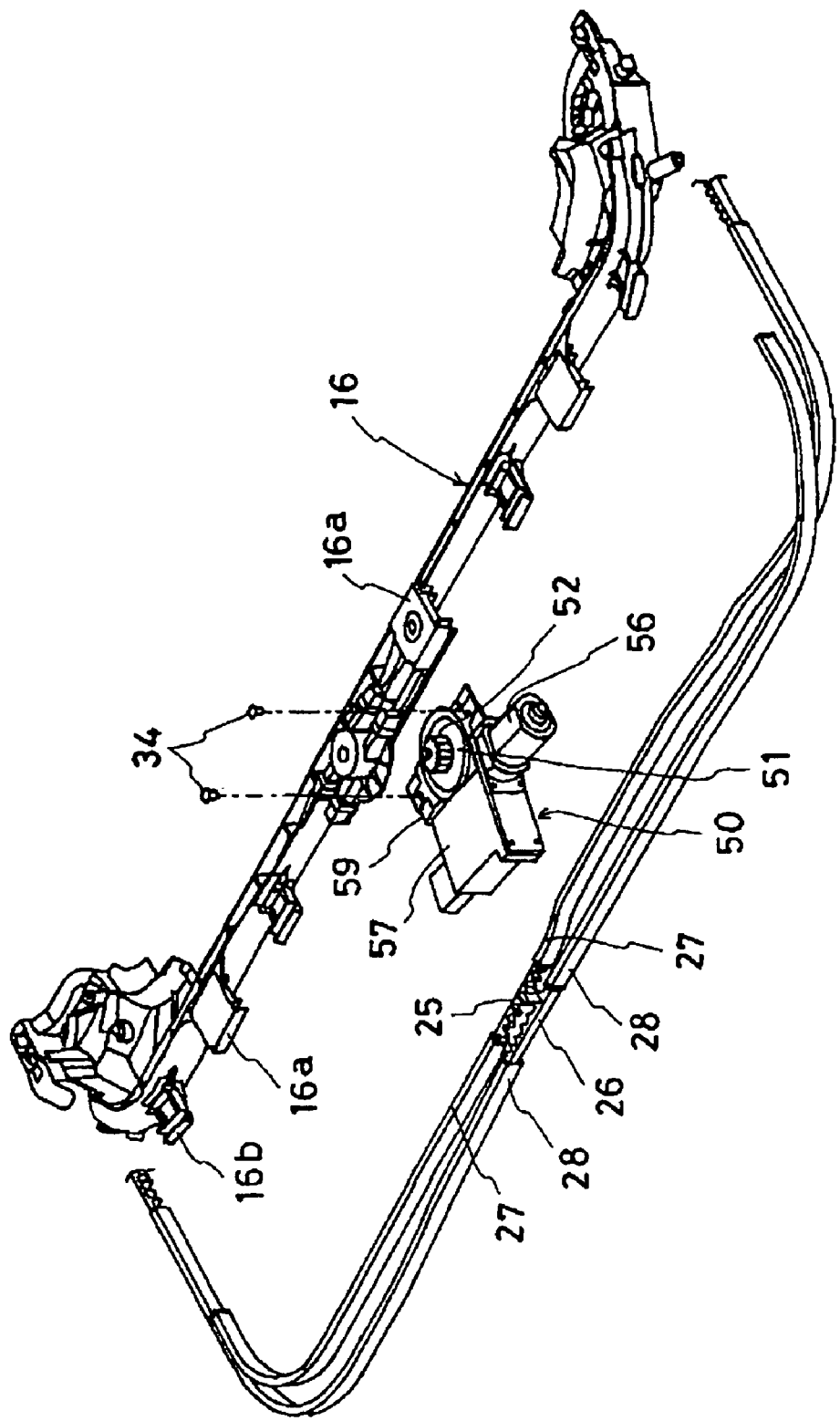
FIG. 3 is a perspective view schematically illustrating a configuration of parts nearby a drive device.

As shown in FIG. 1 and FIG. 3, two pairs of casing 27, 28 made of resin are provided along the front housing 16 and are formed with hollow cross section.

Figure 5:
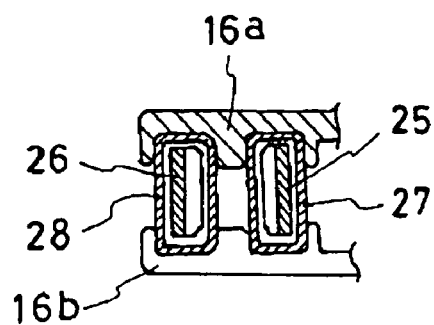
FIG. 5 is a cross sectional view taken along line 5—5 in FIG. 1.

Casings 27, 28 are engaged to the front housing 16 by plural upper holder portions 16a and downside holder portions 16b as shown in FIG. 3 and FIG. 5. The spur tooth rack belt 25, 26 is reciprocably inserted to each casing 27, 28.

A drive device 50 includes a motor 56 attached by fixing to a case 59 of the drive device. The motor 56 can rotate normal and reverse by operating a switch (not shown). The rotation of the motor 56 is transmitted to the worm 58 (see FIG. 2) of a reduction gear mechanism 57, and then rotates an output gear wheel 51 including gear wheel 53 engaging with the worm 58. In addition, the output gear wheel is integrally formed with a spur gear 52 (drive gearwheel).

Figure 4:
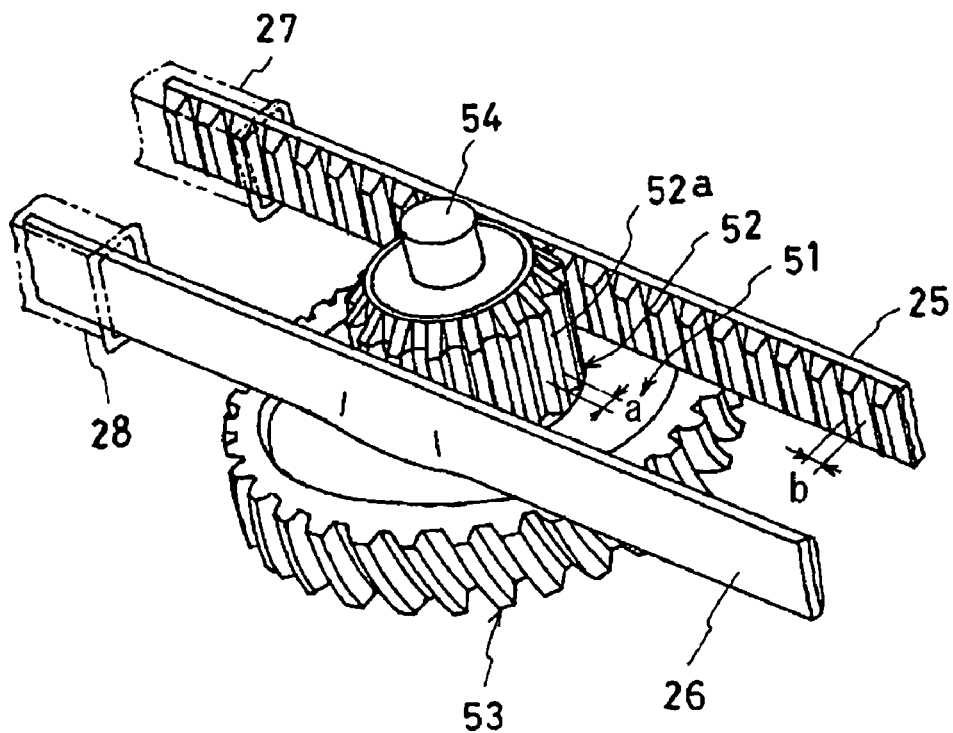
FIG. 4 is a perspective view schematically illustrating engaging condition of a spur tooth rack belt and a spur gear.

As shown in FIG. 2, FIG. 3 and FIG. 4, the spur gear 52 is engaged with two spur tooth rack belts 25, 26, and is put between them. Each casing 27, 28 and the output gear wheel 51 are put between the case 59 and the front housing 16, and assembled with them using an engaging member 34 (such as screws). The rotational axis 54 of the output gear wheel 51 is rotatably supported by the case 59 and the front housing 16 at upper and lower end of the rotational axis 54. One end of each spur tooth rack belt 25, 26 is conducted to each guide rail 6 through each casing 27, 28, and connected to the operation mechanism 8 supported by each guide rail 8. Both sides of the operation mechanism 8 are slide to forward by rotating to one direction of the spur gear 52, and are slide to backward by rotating to the other direction of the spur gear 52.

As shown in FIG. 2 and FIG. 4, external diameter of the spur gear 52 is changed along the gear width (up-and-down direction in FIG. 4), and face of the spur gear 52 is formed as a trapezoidal cone viewed from orthogonal direction to rotational axis of the spur gear 52 (perpendicular direction to the paper in FIG. 2). Namely, the spur gear 52 is formed that external diameter of the face is larger at lower portion than upper portion, and tooth thickness (a) of a tooth 52a is also thicker at lower portion than upper portion.

In addition, as shown in FIG. 2, cross sectional interior surface 16c of the front housing 16 is tapered parallel to edge line of the spur wheel 52 shaped trapezoidal cone. Back face of the spur tooth rack belt 25, 26 contacts with interior surface 16c of the front housing 16. Namely, the spur tooth rack belt 25, 26 is restricted by interior surface 16c of the front housing 16 to be kept in a normal meshing position.

Working mechanism of the sliding roof device 10 is that the movable panel 21 slides and tilts to open and close the opening portion 12 by operating the switch (not shown) as same as known sliding roof devices.

When the sliding roof device 10 works, the spur gear rack belt 25, 26 can easily lean to up-and-down direction along spur wheel 52 shaped as a trapezoidal cone since the spur gear rack belt 25, 26 is made of resin, and an interstice is formed between the casing 27, 28 and the spur gear rack belt 25, 26. An interstice is also formed between each front housing 16 and the case 59 at upside and downside of the spur tooth rack belt as shown in FIG. 2. Additionally, an interstice is also formed between upside and downside of the spur tooth rack belt 25, 26 and the casing 27, 28 as shown in FIG. 5. Thus, when the interstice is arisen between each tooth of the spur wheel 52 and the spur tooth rack belt 25, 26 because of the manufacturing dimensional deviation of the spur tooth rack belt 25, 26 and the spur wheel 52, and deformation of the resin-made spur tooth rack belt 25, 26 by loading, the interstice can be eliminated by means of that the spur tooth rack belt 25, 26 slightly falls down to the spur wheel 52. The spur tooth rack belt 25, 26 is always engaged with the trapezoidal cone-shaped spur wheel 52 with minimum interstice. Unmatched engagement is prevented to each tooth of the spur wheel 52 and the spur tooth rack belt 25, 26. Then, engagement noise is suppressed.

Above described configuration makes an additional advantage since the interior surface 16c of the front housing 16 is tapered. When the front housing 16 is manufactured by using a molding process, the front housing 16 can easily be detached from the mold, and the interior surface 16c can be accurately molded.

As a forming method of the spur wheel 52 with changing the tooth thickness along the gear width (in the gear rotation axis direction), various methods are known and optional, for example, forming method of bevel gear or forming with changing rack shift coefficient in tooth thickness direction.

The principles, a preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A sliding roof device for vehicles, comprising:
   a movable panel to open or close an opening portion provided at a vehicle roof;
   a pair of guide rails provided at both sides in width direction of the opening portion and extending in longitudinal direction of the vehicle;
   an operation mechanism guided by the guide rail and supporting the movable panel;
   a drive device driving the operation mechanism; and
   a spur tooth rack belt connecting the operation mechanism with the drive device;
   wherein the drive device includes a drive gearwheel engaging with the spur gear rack belt, and the drive gearwheel is formed with variable tooth thickness along the gear width.

2. A slide door opening and closing device for vehicles according to claim 1, wherein the drive device is formed as trapezoidal cone.

* * * * *